United States Patent
Kakutani

(10) Patent No.: US 9,075,550 B2
(45) Date of Patent: Jul. 7, 2015

(54) PRINTING APPARATUS, PRINTING METHOD, AND STORAGE MEDIUM

(71) Applicant: CANON KABUSHIKI KAISHA, Tokyo (JP)

(72) Inventor: Naoya Kakutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/184,564

(22) Filed: Feb. 19, 2014

(65) Prior Publication Data

US 2014/0233053 A1    Aug. 21, 2014

(30) Foreign Application Priority Data

Feb. 20, 2013  (JP) ................................ 2013-030898

(51) Int. Cl.
| | |
|---|---|
| *G06K 15/00* | (2006.01) |
| *G06F 3/12* | (2006.01) |
| *H04N 1/00* | (2006.01) |
| *H04N 1/32* | (2006.01) |
| *H04N 1/44* | (2006.01) |

(52) U.S. Cl.
CPC ...... *G06F 3/1222* (2013.01); *H04N 2201/3246* (2013.01); *H04N 1/00233* (2013.01); *H04N 1/32128* (2013.01); *H04N 1/4413* (2013.01); *H04N 1/444* (2013.01); *H04N 2201/3278* (2013.01); *H04N 2201/0082* (2013.01); *G06F 3/1238* (2013.01)

(58) Field of Classification Search
None
See application file for complete search history.

(56) References Cited

U.S. PATENT DOCUMENTS

| | | | | |
|---|---|---|---|---|
| 6,952,780 | B2 * | 10/2005 | Olsen et al. ..................... | 726/26 |
| 7,337,472 | B2 * | 2/2008 | Olsen et al. ..................... | 726/26 |
| 7,551,319 | B2 * | 6/2009 | Ogasawara .................... | 358/1.9 |
| 7,613,412 | B2 * | 11/2009 | Harada et al. .................. | 399/81 |
| 8,456,661 | B2 * | 6/2013 | Takahashi ..................... | 358/1.14 |
| 2004/0213615 | A1 | 10/2004 | Nakao | |
| 2005/0210259 | A1 | 9/2005 | Richardson | |
| 2006/0001899 | A1 | 1/2006 | Kanno | |
| 2006/0268323 | A1 | 11/2006 | Hashimoto | |
| 2009/0268227 | A1 * | 10/2009 | Kaneko ......................... | 358/1.14 |
| 2009/0316189 | A1 | 12/2009 | Yamauchi | |
| 2011/0235086 | A1 * | 9/2011 | Watanabe ..................... | 358/1.14 |
| 2011/0273738 | A1 * | 11/2011 | Tanaka et al. ................ | 358/1.14 |

(Continued)

FOREIGN PATENT DOCUMENTS

| | | |
|---|---|---|
| JP | 1264865 A | 10/1989 |
| JP | 2003182187 A | 7/2003 |

(Continued)

*Primary Examiner* — Satwant Singh
(74) *Attorney, Agent, or Firm* — Canon U.S.A., Inc. IP Division

(57) ABSTRACT

A printing apparatus includes a storage unit configured to store print data including a password upon receipt of the print data, a receiving unit configured to receive a print instruction for the stored print data from a user, an authentication unit capable of performing user authentication, and a printing unit configured to perform printing without causing an authenticated user to enter a password in a case where an owner of the print-instructed print data matches the authenticated user, and to perform printing in response to a match between a password received from a user and the password included in the print data in a case where the owner of the print-instructed print data differs from the authenticated user, or in a case where a print instruction is received without user authentication by the authentication unit.

14 Claims, 13 Drawing Sheets

(56) References Cited

U.S. PATENT DOCUMENTS

| | | | |
|---|---|---|---|
| 2013/0050759 A1* | 2/2013 | Tsuchiya | 358/1.15 |
| 2014/0068715 A1* | 3/2014 | Kondoh | 726/3 |
| 2014/0211240 A1* | 7/2014 | Maki | 358/1.14 |
| 2014/0293315 A1* | 10/2014 | Takarabe et al. | 358/1.14 |

FOREIGN PATENT DOCUMENTS

| | | |
|---|---|---|
| JP | 2007-237685 A | 9/2007 |
| JP | 2009223610 A | 10/2009 |

\* cited by examiner

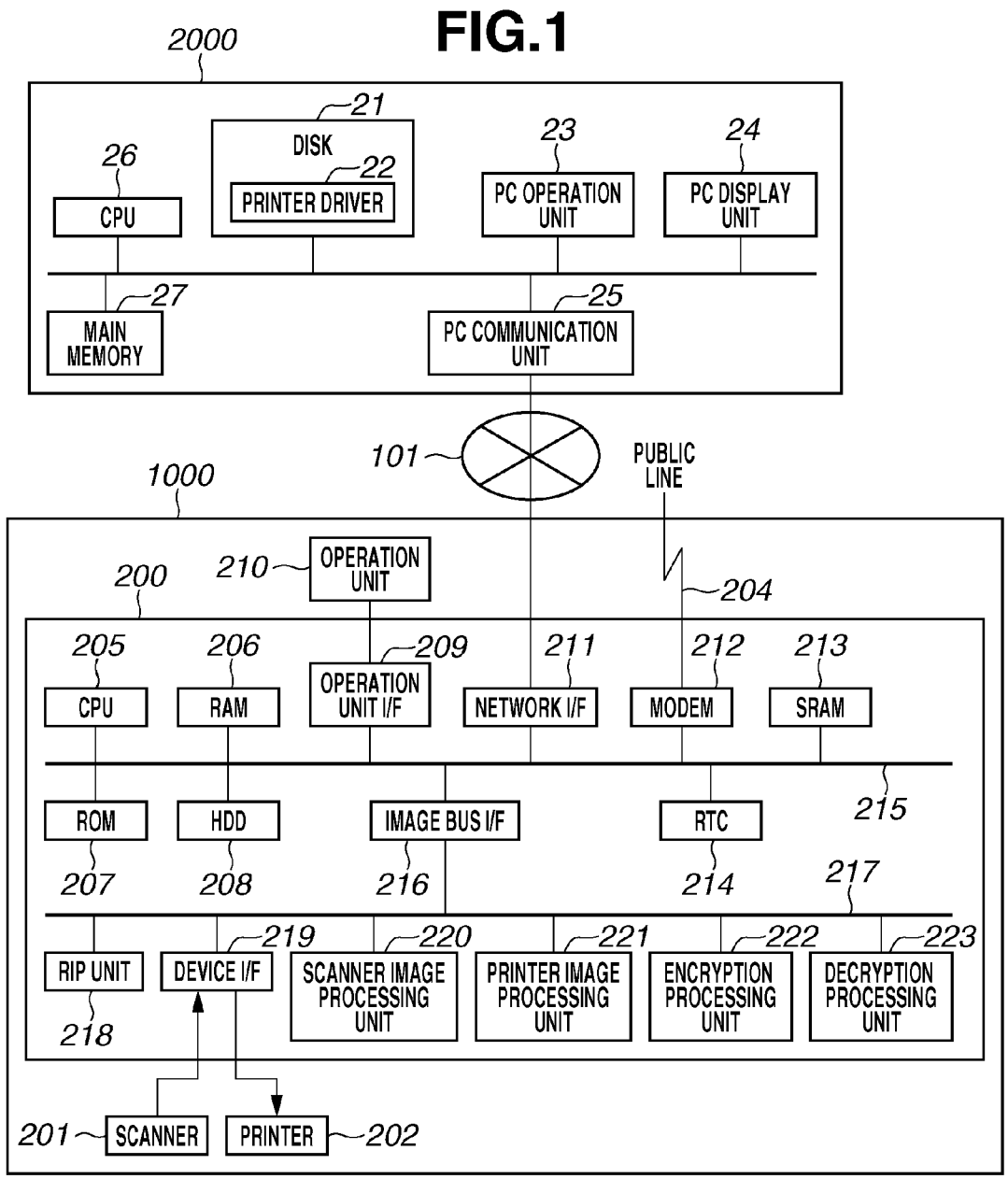

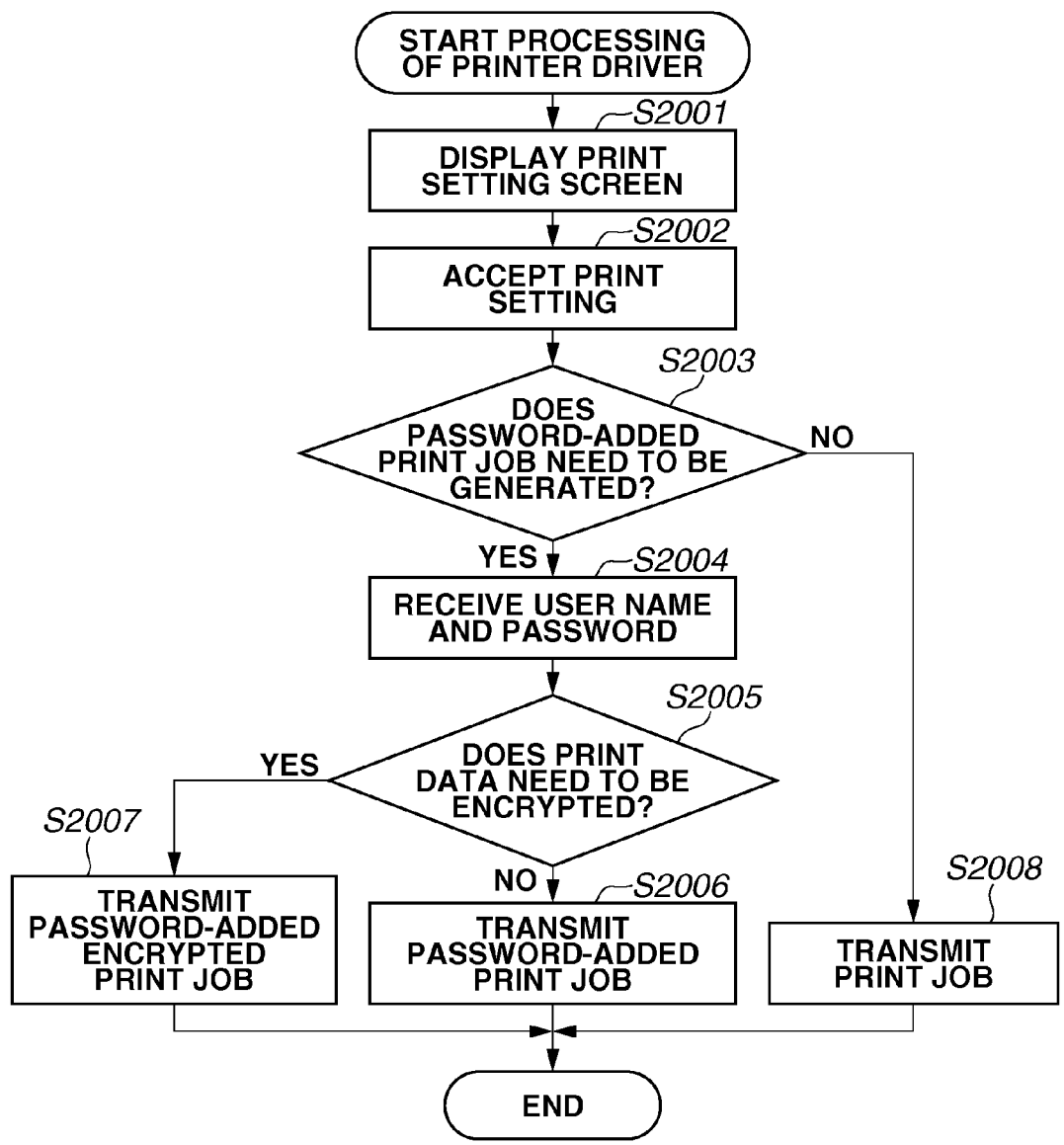

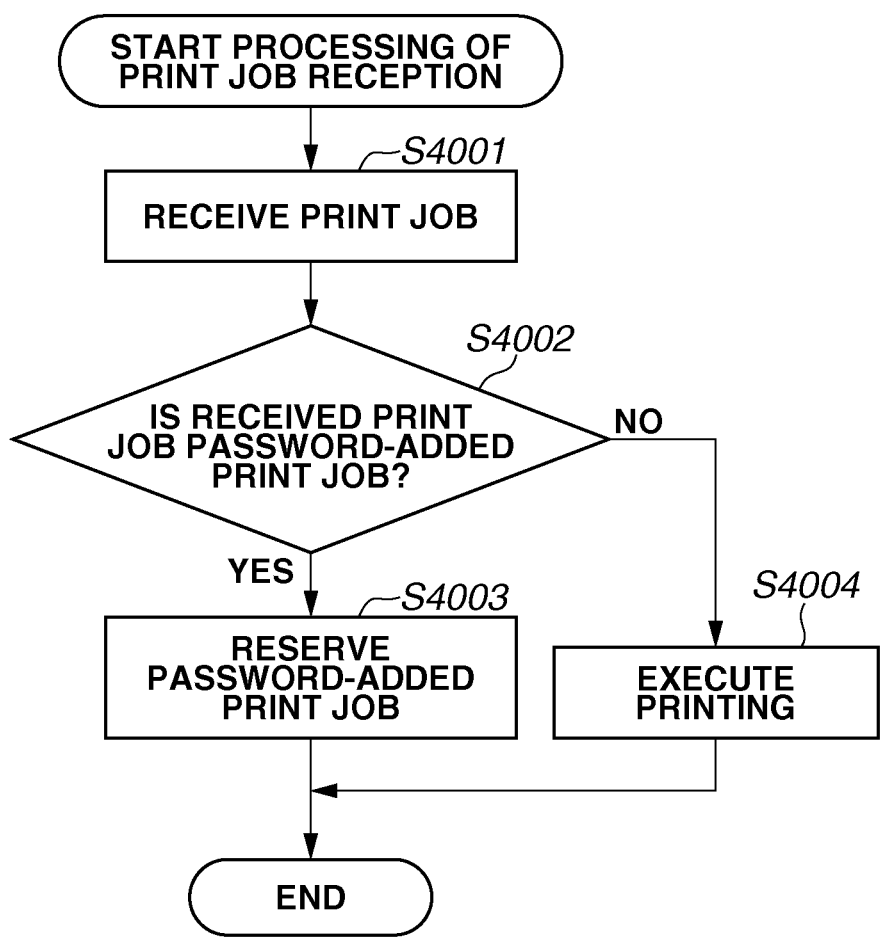

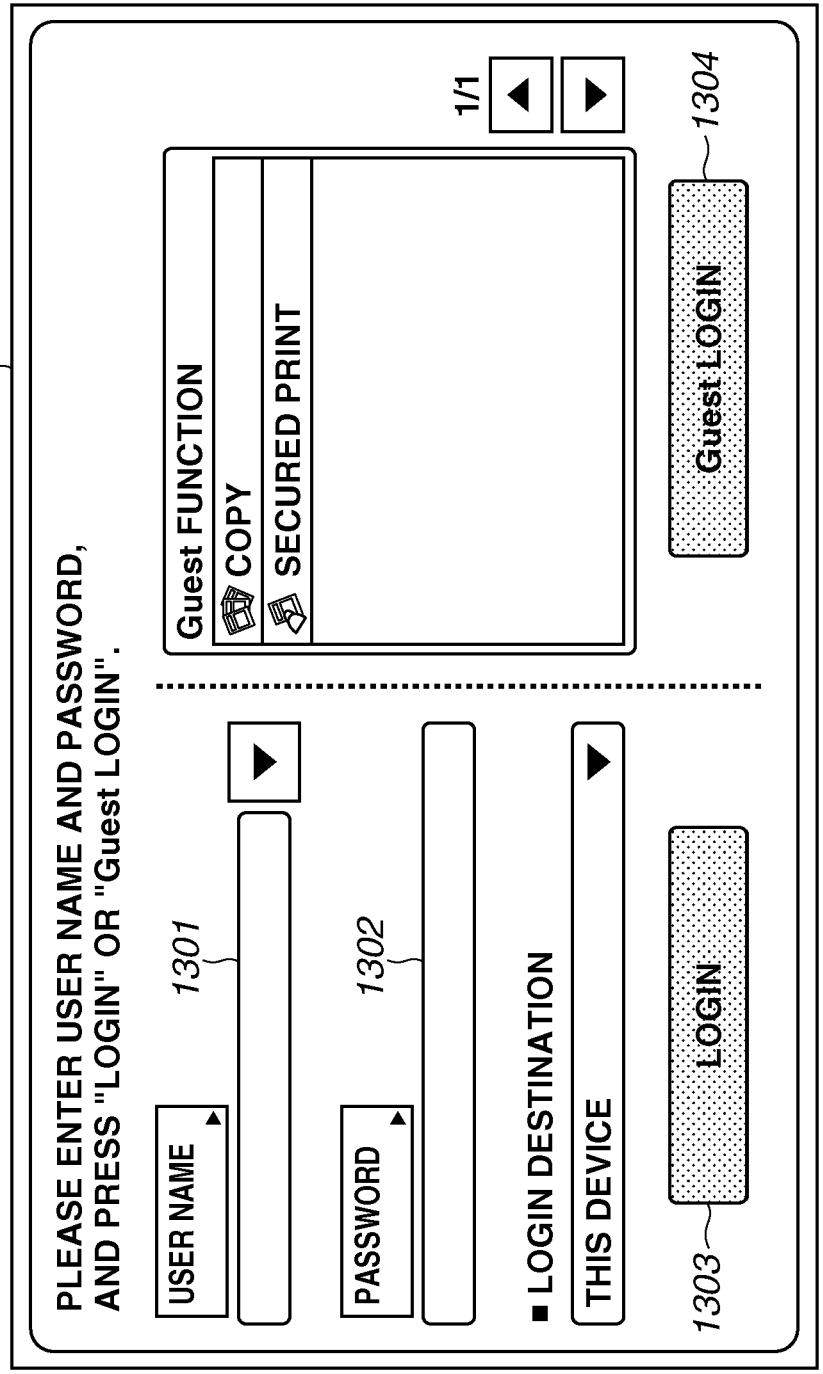

PRINTING APPARATUS, PRINTING METHOD, AND STORAGE MEDIUM

BACKGROUND OF THE INVENTION

1. Field of the Invention

The present invention relates to a printing apparatus for printing print data received from an external device.

2. Description of the Related Art

A reservation printing system has recently become widespread. The reservation printing system enables print data transmitted from a personal computer (PC) to be reserved in a printer or a print server. In the reservation printing system, the print data is stored in a hard disk of the printer or a server on a network, and the printer starts printing the print data in response to a specific operation performed in front of the printer by a user. The reservation printing system is used, for example, in a case where the printer is a shared printer connected to a network, and a printed product to be output needs to be prevented from being viewed by others.

Japanese Patent Application Laid-Open No. 1-264865 discusses a printer receiving and temporarily storing print data to which identification information is added. This printer starts printing if the identification information added to the print data matches identification information entered from a front panel of the printer.

In addition, Japanese Patent Application Laid-Open No. 2003-182187 discusses an image recording apparatus which permits printing of only a print job of an authenticated user. This image recording apparatus accumulates print jobs and user information upon receipt of a print job designated for confidential printing. Then, the image recording apparatus performs user authentication to print only the print job of the authenticated user.

Moreover, Japanese Patent Application Laid-Open No. 2009-223610 discusses a printing system including a printer. The printer receives print data corresponding to an authenticated user from a print server, and prints the received print data. The printing system enables such a printer to delete password information from the print data to print the print data.

However, the above reservation printing has the following problems in a case where user authentication is validated, and the printer prints print data requiring entry of identification information by a user for performing the printing. That is, although the user is already authenticated, the user needs to enter the identification information for performing the printing. This complicates user operation.

Moreover, in a case where user authentication is required for the printing, an unauthenticated user cannot even instruct the printer to print reserved print data. This severely impairs usability.

SUMMARY OF THE INVENTION

The present invention is directed to a printing apparatus capable of selectively executing reservation printing either after user authentication is performed or after a password is entered by a user.

According to an aspect of the present invention, a printing apparatus includes a reception unit configured to receive print data including a password, a storage unit configured to store the print data received by the reception unit, a receiving unit configured to receive a print instruction for the print data stored in the storage unit from a user, an authentication unit capable of performing user authentication, and a printing unit configured to perform printing without causing an authenticated user to enter the password in a case where an owner of the print-instructed print data matches the user authenticated by the authentication unit, and to print the print data in response to a match between a password received from the user and the password included in the print data stored in the storage unit in a case where the owner of the print-instructed print data differs from the user authenticated by the authentication unit, or in a case where the print instruction is received by the receiving unit without user authentication by the authentication unit.

Further features of the present invention will become apparent from the following description of illustrative embodiments with reference to the attached drawings.

BRIEF DESCRIPTION OF THE DRAWINGS

FIG. 1 is an overall view illustrating a network system including a multifunction peripheral as an example of a printing apparatus, and a PC as an example of an external device.

FIG. 2 is a flowchart illustrating print job transmission processing executed by the PC.

FIG. 4 is a flowchart illustrating print job reception processing executed by the multifunction peripheral.

FIG. 13 is a diagram illustrating an example of a login screen displayed when a user logs in to the multifunction peripheral.

DESCRIPTION OF THE EMBODIMENTS

Figure 3A:
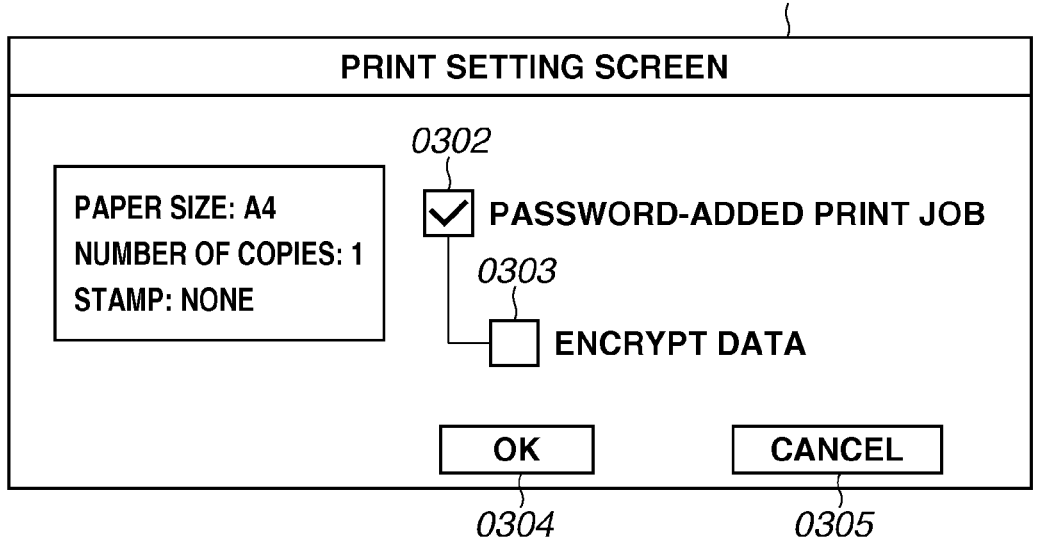
FIGS. 3A and 3B are diagrams each illustrating an example of a setting screen for a printer driver of the PC.

Various illustrative embodiments, features, and aspects of the invention will be described in detail below with reference to the drawings.

First, terms used in the illustrative embodiments are defined. In the illustrative embodiments, a job for printing print data including a password is referred to as "a password-added print job". The password-added print job causes printing to begin if a password entered by a user for the printing matches the password included in the print data.

In the illustrative embodiments, moreover, a password-added print job including encrypted print target data is referred to as "a password-added encrypted print job".

A first illustrative embodiment is described.

FIG. 1 is an overall view illustrating a network system including a digital multifunction peripheral (hereinafter called an MFP) 1000 and a personal computer (hereinafter called a PC) 2000. In the network system illustrated in FIG. 1, the MFP 1000 and the PC 2000 are communicably connected to each other via a network 101.

The network 101 may be connected to a plurality of MFPs (not illustrated) and other PCs (not illustrated) through a relay device (not illustrated) such as a switching hub and a router. Moreover, the network system illustrated in FIG. 1 may be connected to the Internet through the router (not illustrated) connected to the network 101.

In the network system illustrated in FIG. 1, each of the MFP 1000 and the PC 2000 has a unique Internet Protocol (IP) address and a host name. In addition, this network system has a unique domain name indicating a location thereof on the Internet.

In the present illustrative embodiment, the MFP 1000 is described as an example of a printing apparatus. However, the printing apparatus may be a single function peripheral instead of the MFP 1000 as long as the single function peripheral has a function of executing the password-added print job.

Moreover, in the present illustrative embodiment, the PC 2000 is described as an example of an external device. However, the external device may be a shared desktop computer, a server computer, and a mobile terminal instead of the PC 2000.

Next, a hardware configuration of the MFP 1000 is described.

A control unit 200 connects a scanner 201 serving as an image input device with a printer 202 serving as an image output device. The control unit 200 is connected to the network 101 and a public line 204, so that information is input and output between the control unit 200 and the external device.

A central processing unit (CPU) 205 is a processor for controlling the entire MFP 1000. A random access memory (RAM) 206 serves as a system work memory for the CPU 205 to operate. The RAM 206 also serves as a memory for temporarily storing image data, a user name, and a password. A read only memory (ROM) 207 is a boot ROM in which a boot program for the system is stored. A hard disk drive (HDD) 208 stores system software, applications, and image data. Moreover, the HDD 208 stores programs used to execute flowcharts described below in the present illustrative embodiment. The program stored in the HDD 208 is loaded to the RAM 206 and executed by the CPU 205.

Each step of the flowchart described in the present illustrative embodiment is executed by the CPU 205. In each step, the CPU 205 executes a control program stored in the HDD 208. Alternatively, each step of the flowchart may be executed by a processor other than the CPU 205, or by a combination of such a processor and the CPU 205.

An operation unit interface (I/F) 209 interfaces to an operation unit 210 including a liquid crystal touch panel. The operation unit I/F 209 outputs image data to be displayed on the operation unit 210 to the operation unit 210. Moreover, the operation unit I/F 209 has a function of notifying the CPU 205 of information entered by a user of this system using a keyboard on the operation unit 210. A network I/F 211 is connected to the network 101 to input and output data. A modem 212 is connected to the public line 204, and converts a digital signal into an analog signal. A static random access memory (SRAM) 213 is a non-volatile recording medium operable at high speed. A real time clock (RTC) 214 keeps track of current time even when the control unit 200 is being powered off. These devices are arranged on a system bus 215.

An image bus I/F 216, serving as a bus bridge, connects the system bus 215 to an image bus 217 for transferring image data at high speed, and performs data structure conversion. The image bus 217 includes a Peripheral Component Interconnect (PCI) bus or Institute of Electrical and Electronics Engineers (IEEE) 1394. On the image bus 217, the following devices are arranged.

A raster image processor (RIP) unit 218 rasterizes a page-description language (PDL) code into a bitmap image. A device I/F unit 219 connects the scanner 201 and the printer 202 as image input/output devices to the control unit 200. The device I/F unit 219 performs synchronous/asynchronous conversion of the image data. A scanner image processing unit 220 corrects, processes, and edits input image data. A printer image processing unit 221 performs operations such as a printer correction and a resolution conversion with respect to image data to be printed out. An encryption processing unit 222 encrypts input data. A decryption processing unit 223 decrypts encrypted data if received data (including print data) is encrypted.

Next, a hardware configuration of the PC 2000 is described. The PC 2000 includes a CPU 26, a main memory 27, a disk 21, a PC operation unit 23, a PC communication unit 25, and a PC display unit 24. The CPU 26 is a processor for controlling operations of the PC 2000. The CPU 26 loads programs stored in the disk 21 to the main memory 27, and executes various processing. The disk 21 stores various programs (not illustrated) such as an operating system (OS) and a document creation application. Moreover, the disk 21 stores a printer driver program (hereinafter called a printer driver) 22 corresponding to the MFP 1000.

The PC communication unit 25 transmits and receives various information to and from other devices connected to the network 101. The PC operation unit 23 is, for example, a mouse and a keyboard, and functions as an input device for receiving an input from a user. The PC display unit 24 is, for example, a liquid crystal display, and functions as an output device for outputting the data processed by the CPU 26.

FIG. 2 is a flowchart illustrating operations performed when the PC 2000 transmits a password-added print job to the MFP 1000. Each step of the flowchart illustrated in FIG. 2 is performed by the CPU 26 executing a program, the program being loaded from the disk 21 to the main memory 27.

In step S2001, the PC 2000 receives a print instruction from a user through the PC operation unit 23, so that printing is performed by the MFP 1000. Upon receipt of the print instruction, the CPU 26 activates the printer driver 22 corresponding to the MFP 1000, and displays a print setting screen 0301 illustrated in FIG. 3A on the PC display unit 24.

FIG. 3A is an example of a screen displayed in step S2001 by the printer driver 22. On the print setting screen 0301 illustrated in FIG. 3A, a check box 0302 is displayed. With the check box 0302, the user sets whether to validate printing of a password-added print job. Moreover, on the print setting screen 0301, a check box 0303, an OK button 0304, and a cancel button 0305 are displayed. The check box 0303 is used to set whether to encrypt data.

Figure 3B:
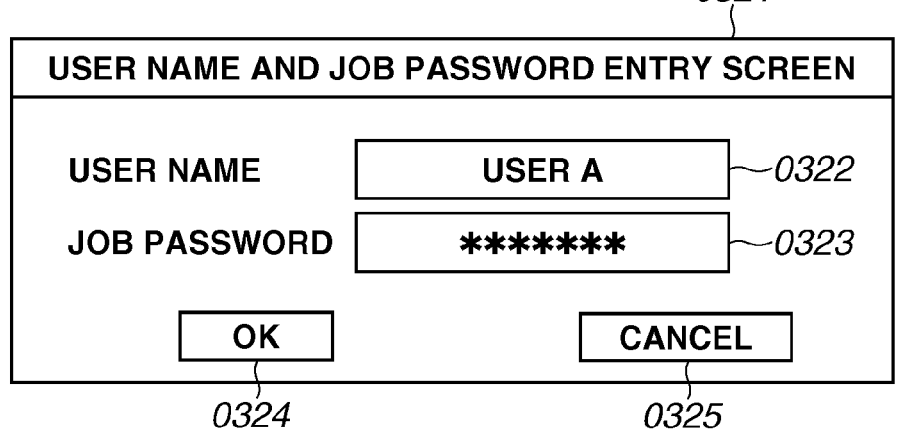

The user places a check mark in the check box 0302 in a case where the user wants to add a password to a print job, and to transmit the resultant print job to the MFP 1000. If the check mark is placed in the check box 0302, the user can also place a check mark in the check box 0303. When the check mark is placed in the check box 0303, the print data (the print target data) is encrypted, and the encrypted print data is transmitted to the MFP 1000. Herein, a password received from the user through a screen illustrated in FIG. 3B is used as an encryption key.

On the print setting screen 0301, moreover, print settings such as paper size, the number of print copies, and the presence or absence of stamp can be set. The printer driver 22 generates a print job including these print settings. In the example illustrated in FIG. 3A, the print settings are as follows: printing of the password-added print job is valid; the printing paper size is A4; the number of print copies is 1; and no stamp is required.

In step S2002, the printer driver 22 accepts the user operation performed on the print setting screen 0301, and writes the print settings in a RAM (not illustrated) of the PC 2000. When the CPU 26 detects the press of the OK button 0304, the operation proceeds to step S2003. Herein, the press of the OK button 304 indicates completion of the print job setting.

In step S2003, the printer driver 22 determines whether a password-added print job needs to be generated based on the setting received in step S2002.

If the printer driver 22 determines that the password-added print job needs to be generated (YES in step S2003), the operation proceeds to step S2004. In step S2004, the printer driver 22 displays a user name and job password entry screen 0321 illustrated in FIG. 3B on the PC display unit 24, and receives a user name and a password from the user. On the other hand, if the printer driver 22 determines that the password-added print job does not need to be generated (NO in step S2003), that is, a normal print job needs to be generated, the operation proceeds to step S2008. In the step S2008, the printer driver 22 generates the normal print job according to the set print setting, and transmits the print data and the generated print job to the MFP 1000.

FIG. 3B illustrates the user name and job password entry screen 0321 displayed in step S2004. On the screen illustrated in FIG. 3B, the user enters the user name in a user name entry field 0322, and the password in a password entry field 0323. The entered user name and password are added to the print job, and the resultant print job is transmitted to the MFP 1000.

The user name to be entered in the user name entry field 0322 is a user identification (ID) (a user identifier) identifying an owner of a print job. The user name is used afterward to collate the user who has logged in to the MFP 1000 with the owner of the job (however, the user name is not used for the collation if user authentication is not executed in the MFP 1000). On the screen illustrated in FIG. 3B, the user name set beforehand as an initial value in the PC 2000 is entered. However, the user name may be changed as necessary on the screen illustrated in FIG. 3B.

The password to be entered in the password entry field 0323 is information required when the MFP 1000 starts printing afterward. That is, the print job to which the password is added (the password-added print job) is kept on standby in the MFP 1000 while the MFP 1000 is awaiting a password entry. The MFP 1000 starts printing when the password (the password entered by the user on the screen illustrated in FIG. 3B) is entered using the operation unit 210. Accordingly, the password-added print job can be printed as a printed product by only the person who knows the password added to the job. This can reduce the likelihood that a person who does not know the password steals a glance at the printed product. On the other hand, the user needs to enter the password in not only the PC 2000, but also the MFP 1000 for the password-added print job. Although this maintains security, the user has extra labor to enter the password in the MFP 1000. In the present illustrative embodiment, thus, an entry of the password in the MFP 1000 can be omitted if the user is already authenticated before logging in to the MFP 1000. Such omission of password entry will be described in detail below. In the present illustrative embodiment, the user enters the password using the screen illustrated in FIG. 3B. However, the printer driver 22 may generate a unique password for a job. In such a case, the password generated by the printer driver 22 is displayed and notified to the user. Moreover, the printer driver 22 may request the MFP 1000 to generate a password. In such a case, the printer driver 22 receives the password generated by the MFP 1000, and notifies the user of the received password.

The description returns to FIG. 2. In step S2004, the printer driver 22 receives the user name and the password entered through the PC operation unit 23 by the user. The user name and the password received in step S2004 are those entered into the user name entry field 0322 and the password entry field 0323 (see FIG. 3B) displayed on the PC display unit 24. When the PC operation unit 23 receives a press of an OK button 0324 indicating that the password-added print job setting is completed, the operation proceeds to step S2005.

In step S2005, the printer driver 22 determines whether the print target data needs to be encrypted based on the encryption setting received in step S2002. If the printer driver 22 determines that the print target data needs to be encrypted (YES in step S2005), the operation proceeds to step S2007. If the printer driver 22 determines that the print target data does not need to be encrypted (NO in step S2005), the operation proceeds to step S2006.

In step S2006, the printer driver 22 generates a password-added print job including the print target data (print data), the user name, and the password, and transmits the generated print job to the MFP 1000. The print job also includes a domain name of the PC 2000 and other information. The user name is used to collate the user who has logged in to the MFP 1000 with the owner of the job, whereas the password is used when the MFP 1000 starts printing.

In step S2007, the printer driver 22 encrypts the print data with the password received in the step S2004 as an encryption key. Herein, the printer driver 22 uses an algorithm such as Secure Hash Algorithm (SHA) 256 as an encryption method using the password. The printer driver 22 transmits a print job (a password-added encrypted print job) including an encryption flag indicating that the print data is encrypted, the encrypted print data, the user name, and the password to the MFP 1000.

In step S2008, the printer driver 22 generates a print job including the print data, the user name, and the password as a password-added print job, and transmits the generated print job to the MFP 1000.

According to the processing illustrated in FIG. 2, therefore, the print job is transmitted from the printer driver 22 of the PC 2000 to the MFP 1000.

FIG. 4 is a flowchart illustrating operations performed when the MFP 1000 receives a print job. Each step illustrated in FIG. 4 is performed by the CPU 205 executing a program, the program being loaded from the HDD 208 to the RAM 206. The processing illustrated in FIG. 4 begins when the MFP 1000 receives the print job from the PC 2000 (or other external device).

In step S4001, the CPU 205 receives the print job transmitted from the PC 2000 through the network I/F 211. Then, the CPU 205 extracts print data and a print setting from the received print job.

In step S4002, the CPU 205 determines whether the received print job is a password-added print job based on the print setting extracted in step S4001. Particularly, the CPU 205 checks whether the password-added print job includes a job password. If the password-added print job includes the job password, the CPU 205 determines that the received job is the password-added print job (YES in step S4002), and the operation proceeds to step S4003. On the other hand, if CPU 205 determines that the received job is not the password-added print job (NO in step S4002), the operation proceeds to step S4004.

In step S4003, the CPU 205 outputs the received print data to the RIP unit 218. Then, the CPU 205 causes the bitmap image data rasterized by the RIP unit 218 to be linked with a password entry wait state, and stores the resultant data in the HDD 208. The bitmap image data stored in step S4003 is not output to the printer 202 until the job password and the entered password are collated upon entry of the password through the operation unit 210. That is, the received password-added print job is reserved, instead of being printed in this step. In step S4003, moreover, the domain name, the user name, and the job password in the print settings are managed by being linked with the bitmap image data.

If the CPU 205 determines that the received job is not the password-added print job (NO in step S4002), that is, the received data is a normal print job, the operation proceeds to step S4004. In step S4004, the CPU 205 outputs the received print data to the RIP unit 218, and then outputs the bitmap image data rasterized by the RIP unit 218 to the printer 202. Accordingly, the printer 202 prints an image on a sheet based on the output bitmap image data.

A series of these operations are performed when the MFP 1000 receives the print job.

The present illustrative embodiment has been described using an example case where a print job to which a password is not added (a normal print job) is printed without being reserved. However, the MFP 1000 may be set in a forced reservation mode. In such a case, print data is reserved by the processing as step S4003 even if a password is not added to the print job.

In step S4003, in practice, the CPU 205 checks whether the received print job includes an encryption flag, and determines whether the print data included in the print job is encrypted, although such an operation is not described in FIG. 4. If the CPU 205 determines that the encryption flag is included, this implies that the print data in the print job is encrypted. Accordingly, this print data cannot be rasterized into a bitmap image unless the print data is decrypted with a password. Thus, the CPU 205 stores the encrypted print data in the HDD 208 as it is.

On the other hand, if there is no encryption flag in the print job, this implies that the print data in the print job is a plain text. Consequently, the CPU 205 transfers the plain text print data to the RIP unit 218 to rasterize the print data into a bitmap image. Then, the CPU 205 stores the bitmap image in the HDD 208. Accordingly, in a case where the print data is not encrypted, the print data is rasterized into a bitmap image upon receipt of the password-added print job. This can shorten a period of time from when the user goes to a position in front of the MFP 1000 to provide a print instruction to when a printed product is ejected.

Figure 5:
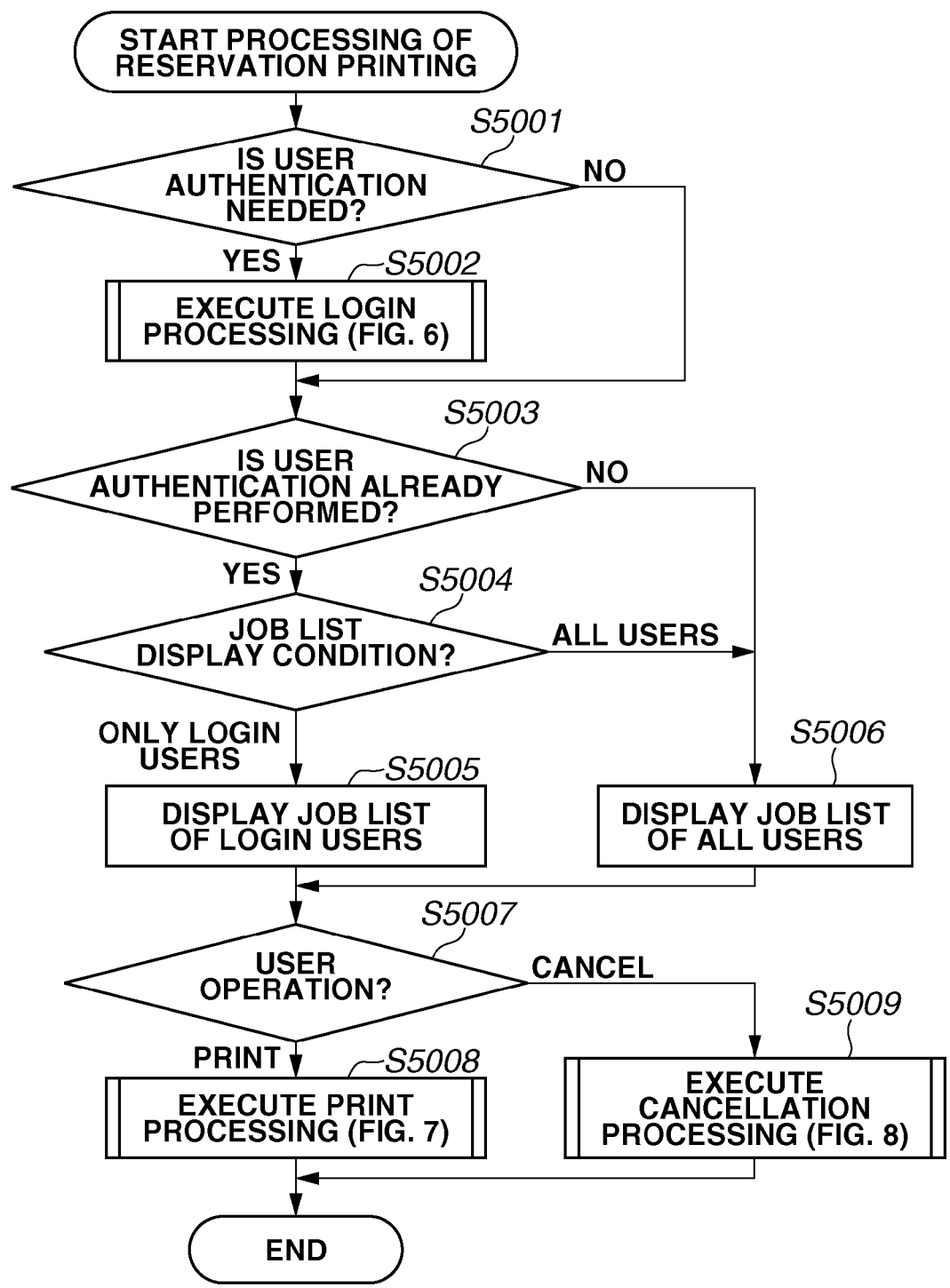
FIG. 5 is a flowchart illustrating a series of operations performed when the multifunction peripheral receives a user operation.

FIG. 5 is a flowchart illustrating operations performed when the MFP 1000 executes or cancels printing of a password-added print job. As similar to FIG. 4, each step illustrated in FIG. 5 is performed by the CPU 205 executing a program, the program being loaded from the HDD 208 to the RAM 206.

In step S5001, the CPU 205 acquires a setting value of the MFP 1000 from the SRAM 213, and determines whether user authentication is needed based on the acquired setting value. Assume that a setting for determining the necessity of the user authentication is registered beforehand in the MFP 1000 by a system administrator. In addition, authentication information (a user ID, a password) of each user is registered beforehand in the MFP 1000 or an authentication server (not illustrated) on the network by the system administrator. Such authentication information is used when the user authentication is performed.

If the CPU 205 determines that the user authentication is needed (YES in step S5001), then in step S5002, the CPU 205 executes login processing. The login processing will be described in detail with reference to FIG. 6. When the user logs in to the MFP 1000 by the login processing, information of the login user is written in the RAM 206. Subsequently, the operation proceeds to step S5003. On the other hand, if the CPU 205 determines that the user authentication is not needed (NO in step S5001), the operation proceeds to step S5003 without the login processing in step S5002.

In step S5003, the CPU 205 acquires the setting value of the MFP 1000 from the SRAM 213, and determines whether the user authentication is already performed by the MFP 1000. Herein, the CPU 205 makes a determination by referring to the setting value used in the processing in step S5001. That is, if the setting value acquired in step S5001 from the SRAM 213 indicates that the user authentication is needed, the user authentication is already performed in step S5002. Consequently, the CPU 205 determines that the user authentication is already performed (YES in step S5003). On the other hand, if the setting value acquired in step S5001 from the SRAM 213 indicates that the user authentication is not needed, the CPU 205 determines that the user authentication is not performed (NO in step S5003).

In step S5004, the CPU 205 checks a display condition of a job list. For example, the CPU 205 acquires a filtering setting for the job list from the SRAM 213. Based on the filtering setting, the CPU 205 determines whether to display all the print jobs or only a print job owned by the login user. The filtering setting represents a setting for determining a print range and a cancellation range of the job on a print job list 9002 illustrated in FIG. 9. If the filtering setting is valid, only the print job of the login user is displayed on the print job list 9002. In such a case, the login user is able to start the printing of only his/her own password-added print jobs. On the other hand, if the filtering setting is invalid, all the print jobs reserved in a password entry wait state in the HDD 208 are displayed on the print job list 9002. In such a case, the login user is able to start the printing of not only his/her own print jobs, but also the print jobs input to the MFP 1000 by others. In the present illustrative embodiment, that is, a user different from the user who inputs a job can log in to the MFP 1000 and receive a printed product of such a job (however, since the printing of the print job is restricted by a password, the user receiving the print job needs to know the password).

Alternatively, in step S5004, the CPU 205 may check authority of the login user, and determine whether this login user has an administrator authority. If the login user has the administrator authority, the print jobs of all the users may be displayed. If the login user does not have the administrator authority, only the job of the login user may be displayed.

In step S5005, the CPU 205 acquires a user name of the login user from the RAM 206, and a user name (user ID) of the print job being managed in a password entry wait state. When the login processing is completed, a login context including the user name identifying the login user is written in the RAM 206. Such login processing will be described below with reference to FIG. 6. The CPU 205 identifies the login user based on this login context written in the RAM 206. Accordingly, in step S5005, the CPU 205 displays, on the operation unit 210, a job list of the password-added print jobs which include the user name corresponding to the user name of the login user.

In step S5006, the CPU 205 displays, on the operation unit 210, a list of all the password-added print jobs stored in a password entry wait state in the HDD 208 of the MFP 1000.

Figure 9:
FIG. 9 is a diagram illustrating a job list of password-added print jobs.

FIG. 9 illustrates an example screen of the job list displayed in step S5005 or step S5006. The print job list 9002 is a list of the password-added print jobs stored in the MFP 1000. In a case where a list of the print jobs is displayed in step S5005, however, only the print job owned by the login user is displayed.

A print button 9003 is used to instruct the MFP 1000 to start printing a selected print job. A cancel button 9004 is used to cancel the printing of the selected print job.

Moreover, the print job list 9002 indicates the presence or absence of print job selection, a reception number, time at which a print job is received, a print job name, a user name of the user who inputs the print job (i.e., an owner of the print job), and job status.

In the example illustrated in FIG. 9, there are five password-added print jobs in the print job list 9002. Among these five print jobs, the password-added print job with a reception number 0001 is being selected. In the example illustrated in FIG. 9, four unencrypted password-added print jobs with reception numbers 0001 through 0004, and one encrypted password-added print job with a reception number 0005 are displayed. An encryption icon 9006 indicates the presence of the encrypted print job.

A job type shown in the print job list 9002 is a password-added print job only. However, a normal print job can also be displayed on this screen.

Figure 7:
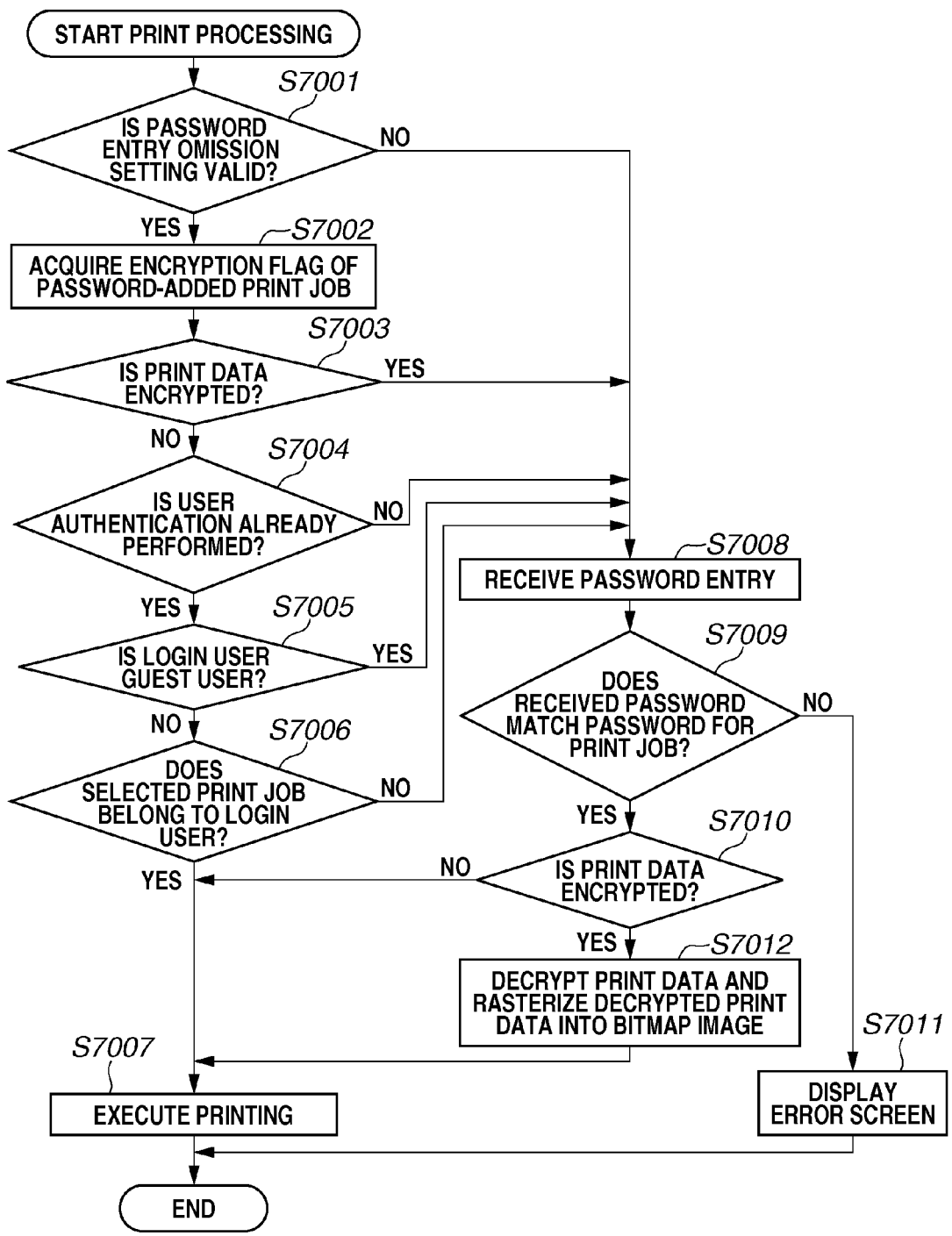
FIG. 7 is a flowchart illustrating print processing executed by the multifunction peripheral.
Figure 8:
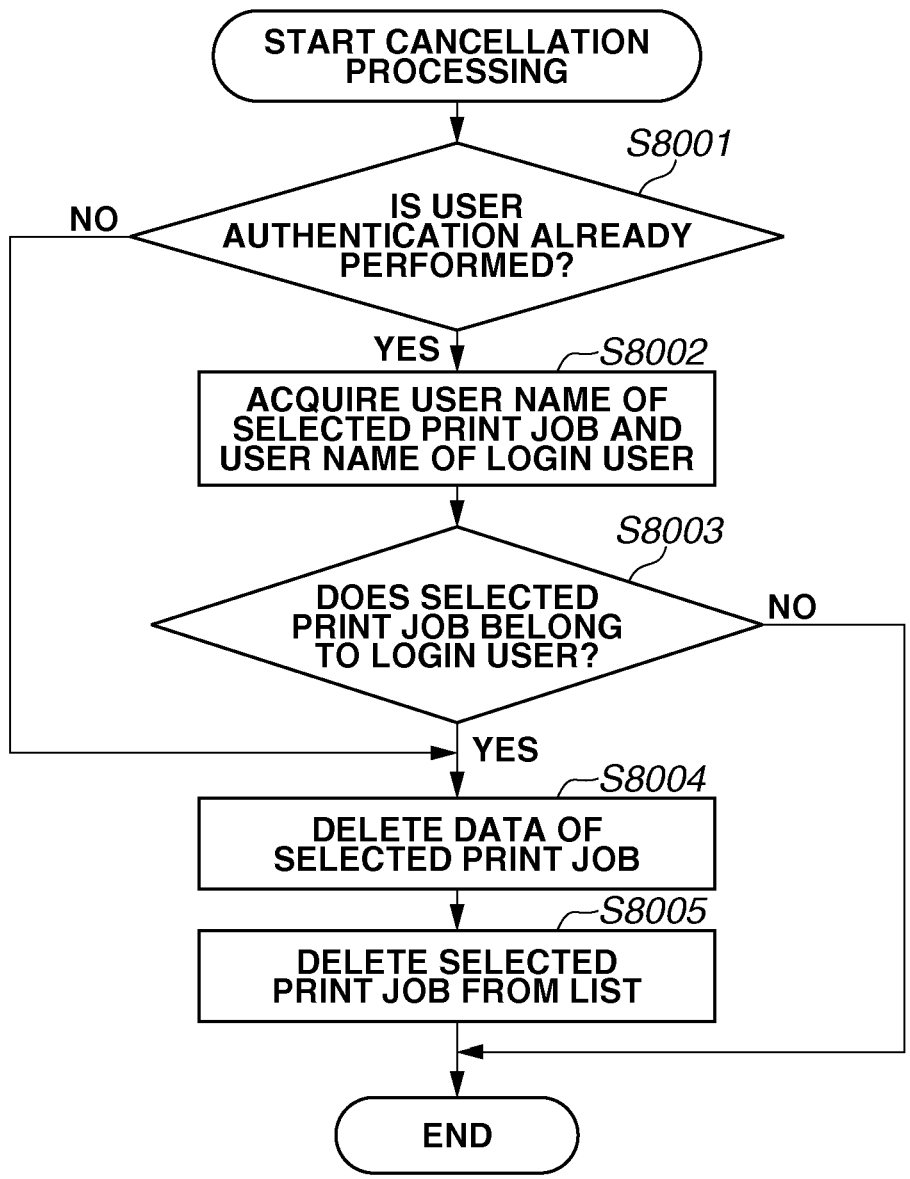
FIG. 8 is a flowchart illustrating print cancellation processing executed by the multifunction peripheral.

In step S5007, the CPU 205 receives selection of an operation target print job by the user. The user selects the operation target print job from the print job list 9002 displayed in step S5005 or S5006. When the user selects the operation target print job, a check mark is placed in a selection check box 9005 which corresponds to the selected job. This causes the target print job to be in the selected state. When a state of at least one job among the jobs listed in the print job list 9002 is changed to the selected state, the cancel button 9004 and the print button 9003 become operable. In step S5007, the CPU 205 further receives an operation of the cancel button 9004 or the print button 9003 from the user through the operation unit 210. For example, if the user needs to print the selected print job, the user presses the print button 9003 to provide a print instruction. On the other hand, if the user needs to cancel the printing of the print job, the user presses the cancel button 9004. In step S5007, the CPU 205 determines whether the received instruction is a print instruction or a cancellation instruction. If the received instruction is the print instruction (PRINT in step S5007), the operation proceeds to step S5008 in which print processing illustrated in FIG. 7 is executed. On the other hand, if the received instruction is the cancellation instruction (CANCEL in step S5007), the operation proceeds to step S5009 in which cancellation processing illustrated in FIG. 8 is executed.

The overall operations performed when the user logs in to the MFP 1000 and uses the reservation printing function have been described.

Next, the login processing performed when the user logs in to the MFP 1000 in step S5002, the print processing of the password-added print job in step S5008, and the print cancellation processing in S5009 of the flowchart illustrated in FIG. 5 are described in detail with reference to FIGS. 6, 7, and 8, respectively.

Figure 6:
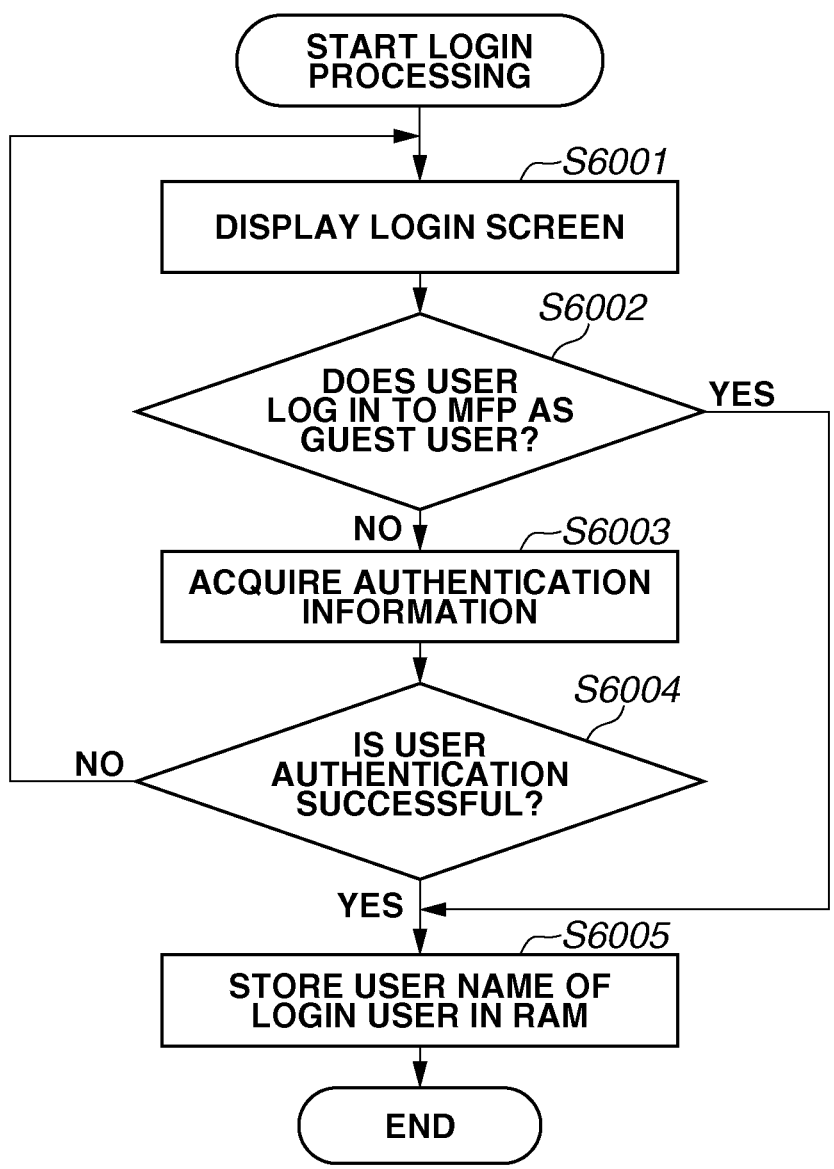
FIG. 6 is a flowchart illustrating login processing executed by the multifunction peripheral.

FIG. 6 is a detailed flowchart illustrating the login processing executed in step S5002 illustrated in FIG. 5.

In step S6001, the CPU 205 displays a login screen on the operation unit 210.

FIG. 13 is a diagram illustrating an example of the login screen displayed in step S6001. This example screen is displayed when the user logs in to the MFP 1000 according to a keyboard authentication method. On the login screen, a message, a user name entry field 1301, a password entry field 1302, a login button 1303, and a guest login button 1304 are displayed.

The user may log in to the MFP 1000 as a login user. In such a case, the user enters a user name and a password in the user name entry field 1301 and the password entry field 1302, respectively. Then, the user presses the login button 1303. On the other hand, the user may log in to the MFP 1000 as a guest user. In such a case, the guest user presses the guest login button 1304 without entering a user name nor a password. Alternatively, a simple character string such as "guest" may be entered as authentication information if the guest user logs in to the MFP 1000.

In step S6002, the CPU 205 checks whether the login button 1303 is pressed or the guest login button 1304 is pressed to determine whether the user logs in to the MFP 1000 as a login user or a guest user. If the CPU 205 determines that the user logs in to the MFP 1000 as the guest user (YES in step S6002), the operation proceeds to step S6005. If the CPU 205 determines that the user does not log in to the MFP 1000 as the guest user (NO in step S6002), the operation proceeds to step S6003.

In step S6003, the CPU 205 acquires the authentication information received through the login screen in step S6002. The acquired authentication information is written into the RAM 206 through the operation unit I/F 209.

In step S6004, the CPU 205 performs user authentication based on the authentication information acquired in step S6002. The user authentication can be performed by the MFP 1000 or an external authentication server on the network such as an active directory and a lightweight directory access protocol (LDAP) server. If the MFP 1000 performs the user authentication, the MFP 1000 collates the entered user name and password with an authentication database stored in the HDD 208. If the external authentication server performs the user authentication, the CPU 205 issues an authentication request including the acquired authentication information to the external authentication server, and receives an authentication result from the authentication server. The result indicates whether the user authentication is successful.

The user authentication may be performed by using other authentication methods such as fingerprint authentication, face authentication, and user authentication using an integrated circuit (IC) card.

If the CPU 205 determines that the user authentication is successful (YES in step S6004), then in step S6005, the CPU 205 permits the user to log in to the MFP 1000, and stores the login context including the user name acquired in step S6003 in the RAM 206. Then, the processing ends. The login context includes information such as login time and expiration date in addition to the user name. If the user logs in to the MFP 1000 as a guest user, the CPU 205 stores information indicating the guest user in the RAM 206.

If the CPU 205 determines that the user authentication is not successful (NO in step S6004), the CPU 205 displays an error message on the operation unit 210, and does not permit the user to use the MFP 1000. Then, the operation returns to step S6001.

The login processing has been described in detail.

FIG. 7 is a flowchart illustrating main processing of the present illustrative embodiment. This flowchart corresponds to the print processing in step S5008 illustrated in FIG. 5.

In step S7001, the CPU 205 acquires a password entry omission setting (see FIG. 10) of the MFP 1000 from the SRAM 213, and determines an operation mode of the MFP 1000. Particularly, if the password entry omission setting acquired from the SRAM 213 is valid (YES in step S7001), the CPU 205 determines that the MFP 1000 is being operated in a mode in which the user can omit an entry of a password (hereinafter called "a password entry omitted mode"). Then, the operation proceeds to step S7002. On the other hand, if the setting value acquired from the SRAM 213 is invalid (NO in step S7001), the CPU 205 determines that the MFP 1000 is being operated in a mode in which the user is required to enter a password (hereinafter called "a password entry required mode"). Then, the operation proceeds to step S7008.

Figure 10:
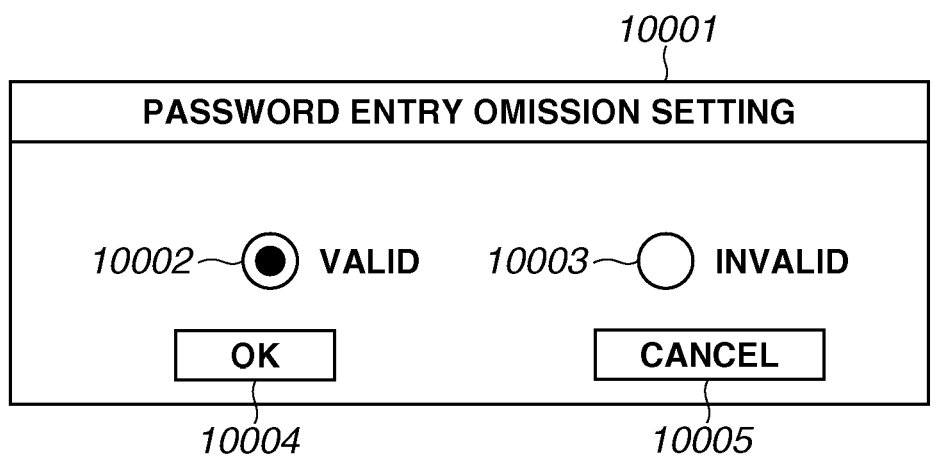
FIG. 10 is a diagram illustrating an example of a setting screen used to validate a password entry omission setting.

FIG. 10 is a diagram illustrating a setting screen 10001 used to set the password entry omission setting. This setting screen 10001 is displayed on the operation unit 210 by the CPU 205. When the system administrator selects a valid button 10002 or an invalid button 10003 on the setting screen 10001, and presses an OK button 10004, the CPU 205 writes a setting value indicating whether to validate or invalidate the password entry in the SRAM 213.

In step S7002, the CPU 205 acquires, from the HDD 208, an encryption flag of the password-added print job having been instructed to be printed. In step S7003, the CPU 205 determines whether the encryption flag of the print-instructed password-added print job is valid (i.e., the print data is encrypted).

If the CPU 205 determines that the print data is encrypted (YES in step S7003), the print data cannot be decrypted without the password being received from the user even when the MFP 1000 is being operated in the password entry omitted mode. Accordingly, the operation proceeds to step S7008. In step S7008, the CPU 205 displays the password entry screen to receive the password from the user. On the other hand, if the print data is not encrypted (NO in step S7003), the operation proceeds to step S7004.

In step S7004, the CPU 205 acquires the setting value of the MFP 1000 from the SRAM 213, and determines whether the user authentication is already performed. Herein, the CPU 205 makes a determination by referring to the setting value used in the processing in step S5001 illustrated in FIG. 5. That is, if the setting value acquired from the SRAM 213 indicates that the user authentication is needed, the user authentication is already performed in step S5002. Consequently, the CPU 205 determines that the user authentication is already performed (YES in step S7004). Then, the operation proceeds to step S7005. On the other hand, if the setting value acquired from the SRAM 213 indicates that the user authentication is not needed, the CPU 205 determines that the user authentication is not performed (NO in step S7004). Then, the operation proceeds to step S7008.

In step S7005, the CPU 205 acquires the login context stored in the RAM 206, and checks an authority of the login user.

In the present illustrative embodiment, there are three authorities as login user authorities: administrator, general user, and guest user authorities. However, these authorities are mere examples. These authorities are registered beforehand by a user authentication management application of the MFP 1000.

The user having the administrator authority can operate an administrative setting of the MFP 1000. In the present illustrative embodiment, only the user having the administrator authority can set the password entry omission setting, and the setting for whether to perform the user authentication. The user having the general user authority can operate items other than the administrative setting, and various functions of the MFP 1000. The guest user can operate a limited number of items in the functions and settings provided by the MFP 1000. The number of items operable by the guest user is less than that by the general user, and the items operable by the guest user have the following features. That is, if a user logs in to the MFP 1000 as a guest user, the user is treated as just a guest by the MFP 1000 no matter who the user is. Thus, even if the user having the guest user authority logs in to the MFP 1000, the MFP 1000 cannot identify an individual.

The description returns to FIG. 7. If the CPU 205 determines that the login user has the guest user authority (YES in step S7005), the operation proceeds to step S7008. If the CPU 205 determines that the login user has the other authority (i.e., the administrator authority or the general user authority) (NO in step S7005), the operation proceeds to step S7006.

In step S7006, the CPU 205 checks whether the user name of the print job selected in step S5007 matches the user name of the login user, and determines whether the print-instructed print job belongs to the login user. If the user name of the print job does not match the user name of the login user (NO in step S7006), the operation proceeds to step S7008. In step 7008, the CPU 205 displays a password entry screen (not illustrated) on the operation unit 210 to receive the password from the user.

If the user name of the print job matches the user name of the login user (YES in step S7006), then in step S7007, the MFP 1000 prints the print job without receiving the password from the user. That is, if the password entry omission setting is valid, the MFP 1000 can execute the printing without receiving the password as long as the password-added print job belongs to the login user (i.e., the owner of the print job is the login user). This can save the login user the labor of password entry when his/her own password-added print job is printed.

In the above processing, if the password entry omission setting is valid, and the login user is a guest user, the MFP 1000 always requests the user to enter the password when the printing is performed. Since the MFP 1000 cannot identify an individual guest user, the MFP 1000 cannot determine the print job of the guest user among password-added print jobs. Consequently, upon receipt of a print instruction for the password-added print job from the guest user, the MFP 1000 always requests the user to enter the password even if the password entry omission setting is valid.

In step S7009, the CPU 205 compares the password received from the user through the operation unit 210 with the password for the password-added print job, and determines whether these passwords match each other. If these passwords match each other (YES in step S7009), the operation proceeds to step S7010.

If the CPU 205 determines that these passwords do not match each other (NO in step S7009), then in step S7011, the CPU 205 displays an error screen on the operation unit 210. Herein, the error screen indicates that the password received from the user does not match the password for the password-added print job.

In step S7010, the CPU 205 acquires the encryption flag of the password-added print job, and determines whether the print-instructed job is a password-added encrypted print job. If the print-instructed job is not a password-added encrypted print job (NO in step S7010), then in step S7007, the MFP 1000 prints the password-added print job.

If the print-instructed job is the password-added encrypted print job (YES in step S7010), the operation proceeds to step S7012. In step S7012, the CPU 205 decrypts the encrypted print data with the password received in step S7008, and outputs the decrypted print data to the RIP unit 218. The RIP unit 218 rasterizes the decrypted print data into a bitmap image. Subsequently, in step S7007, the printer 202 of the MFP 1000 prints an image on a printing sheet based on the bitmap image data output from the RIP unit 218.

The operation of the printing processing has been described with reference to FIG. 7. According to the present illustrative embodiment, even if the user cannot omit an entry of the password for the password-added print job, the printing of the password-added print job can be executed by entering the password in a conventional manner. This processing enables the user to instruct the MFP 1000 to print even a password-added print job of another user by entering a password in a case where the password entry omission function is valid and the job list filtering setting is invalid in the MFP 1000. Therefore, usability of the MFP 1000 can be enhanced.

Next, cancellation processing of the password-added print job is described with reference to a flowchart illustrated in FIG. 8.

The flowchart of FIG. 8 illustrates the cancellation processing of step S5009 illustrated in FIG. 5.

In step S8001, the CPU 205 acquires a setting of the MFP 1000 from the SRAM 213, and determines whether the user authentication is already performed. If the user authentication is not yet performed (NO in step S8001), then in step S8004, the CPU 205 deletes data of the cancellation-instructed password-added print job from the HDD 208. If the user authentication is already performed (YES in step S8001), then in step S8002, the CPU 205 acquires the user name of the cancellation-instructed password-added print job and the user name of the login user.

Subsequently, in step S8003, the CPU 205 determines whether the user name of the cancellation-instructed password-added print job matches the user name of the login user. If the user name of the cancellation-instructed password-added print jobs matches the user name of the login user (YES in step S8003), then in step S8004, the CPU 205 deletes data of the cancellation-instructed password-added print job from the HDD 208. Then, the operation proceeds to step S8005.

In step S8005, the CPU 205 deletes the cancellation-selected password-added print job from the print job list 9002 displayed on the operation unit 210. Then, the print job cancellation processing illustrated in FIG. 8 ends.

If the user name of the cancellation-instructed password-added print jobs does not match the user name of the login user (NO in step S8003), the CPU 205 displays an error screen on the operation unit 210. The error screen indicates that execution of the selected print job cannot be cancelled. Then, the print job cancellation processing illustrated in FIG. 8 ends.

The first illustrative embodiment has been described. According to the first illustrative embodiment, in a case where the login user instructs the MFP 1000 to print the password-added print job, the CPU 205 controls the MFP 1000 such that the printing can be started without an entry of the password included in the print job.

According to the first illustrative embodiment, moreover, the CPU 205 controls the MFP 1000 such that a non-login user can instruct the MFP 1000 to print a reserved print job (however, in a case where the non-login user provides a job execution instruction, the CPU 205 controls the MFP 1000 such that the printing can be started after password entry is requested to the non-login user). Such control reduces the labor of the login user in password entry, and enables the MFP 1000 to execute the printing by performing user authentication one time at the time of login of the user. Moreover, the non-login user can enable the MFP 1000 to start printing the reserved print job on the condition that the non-login user enters the password. Therefore, usability of the MFP can be enhanced.

According to the first illustrative embodiment, moreover, in a case where the MFP 1000 receives a print instruction without user authentication, the CPU 205 always requests the password entry. This can maintain security.

In addition, according to the first illustrative embodiment, the login user of the MFP 1000 can enable a password-added print job of another person to be printed (only if the login user knows a password for this print job). This can enhance usability of the MFP.

Next, a second illustrative embodiment is described. In the first illustrative embodiment, the MFP can cancel the password-added print job of only the login user according to the password-added print job cancellation processing (see FIG. 8). In the second illustrative embodiment, the MFP 1000 can cancel a password-added print job of a user other than the login user if a correct password is entered so that usability is further enhanced. Such a function is referred to as a password entry function in case of cancellation in the second illustrative embodiment.

The second illustrative embodiment is described using a case where the MFP 1000 having the password entry function in case of cancellation is controlled when the login user provides a cancellation instruction for a password-added print job of his/her own or another person. In such a case, the cancellation is instructed according to the presence or absence of user authentication management and a role condition of the login user.

Figure 11:
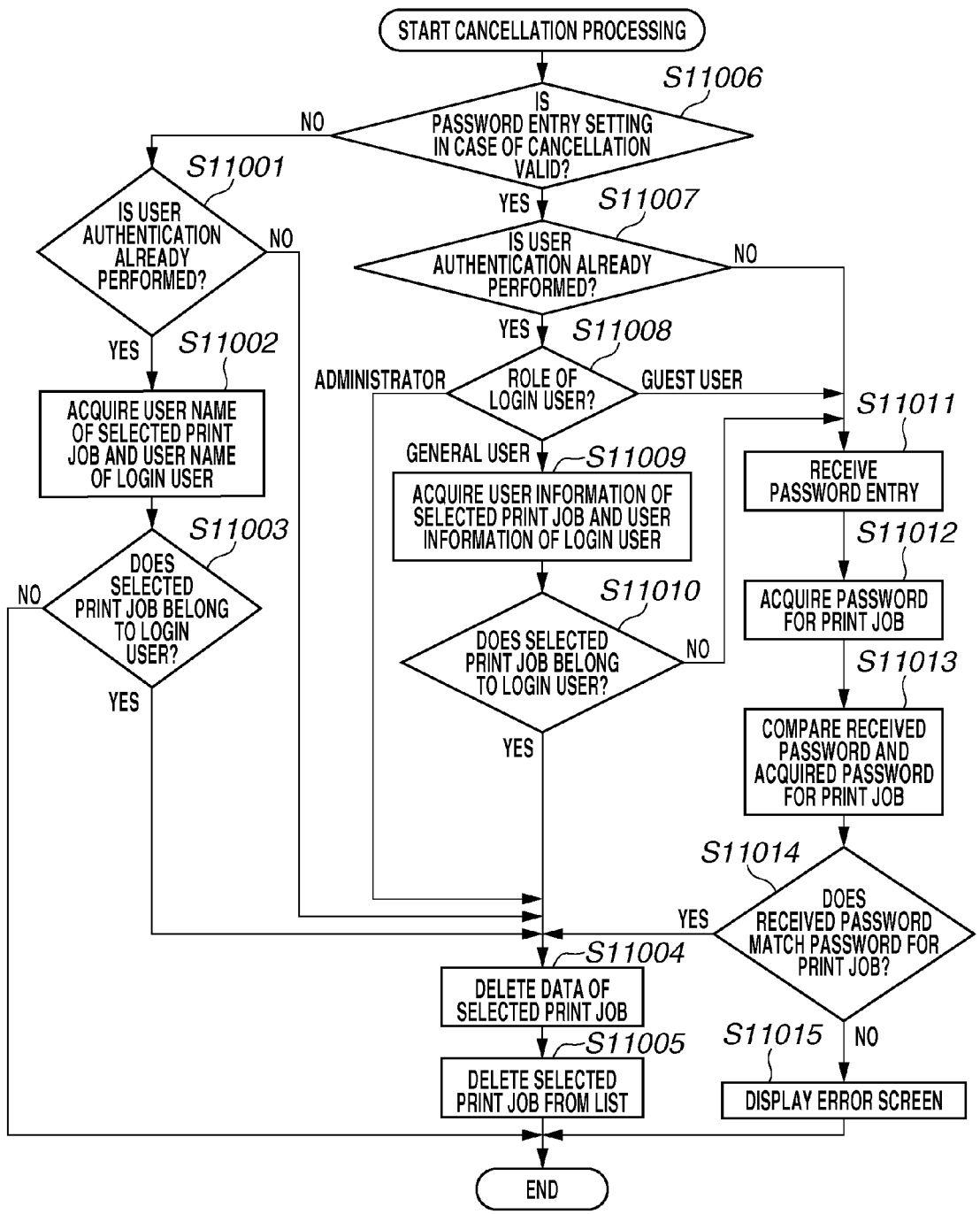
FIG. 11 is a flowchart illustrating print cancellation processing according to a second illustrative embodiment.
Figure 12:
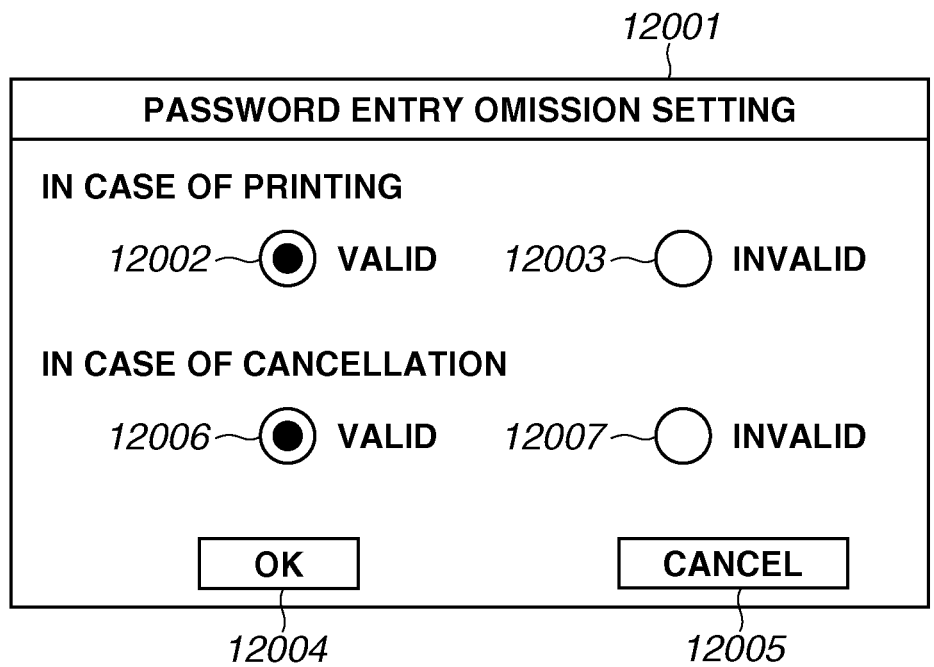
FIG. 12 is a diagram illustrating an example of a setting screen used to validate a password entry omission setting in the second illustrative embodiment.

The control of the password-added print job cancellation processing executed by the MFP 1000 is described in detail by referring to FIGS. 11 and 12. In the present illustrative embodiment, a configuration of the MFP 1000, transmission processing of the password-added print job by a printer driver, login processing by the MFP 1000, print processing of the password-added print job, and reception processing of the print job are similar to those of the first illustrative embodiment, and thus the descriptions thereof are omitted.

In the processing illustrated in FIG. 11 of the second illustrative embodiment, there are steps S11006 to S11015 in addition to the processing illustrated in FIG. 8 of the first illustrative embodiment. These added steps relate to the control performed when a password setting in case of cancellation is valid. These steps S11006 to 11015 are described in detail below. In the flowchart illustrated in FIG. 11 of the present illustrative embodiment, processing from steps S11001 to S11005 is similar to that from steps S8001 to S8005 of the flowchart illustrated in FIG. 8 of the first illustrative embodiment. Moreover, reservation printing, login processing, and print processing of the present illustrative embodiment are similar to the respective processing in FIGS. 5, 6, and 7 of the first illustrative embodiment.

Now, the second illustrative embodiment is described by referring to the differences between the processing of the first illustrative embodiment and that of the second illustrative embodiment.

In step S11006, the CPU 205 acquires the password entry setting in case of cancellation set for the MFP 1000 from the SRAM 213, and determines whether the acquired password entry setting in case of cancellation is valid.

FIG. 12 illustrates a password-added reservation printing function setting screen 12001 according to the second illustrative embodiment. This setting screen 12001 is displayed on the operation unit 210. On the setting screen 12001, a password entry omission setting and a password entry setting in case of cancellation can be set. The password entry omission setting in FIG. 12 is similar to that illustrated in FIG. 10 of the first illustrative embodiment. On the setting screen 12001 illustrated in FIG. 12, a setting of a password entry function in case of cancellation is added to the setting screen illustrated in FIG. 10. This is called "a password entry setting in case of cancellation" in the present illustrative embodiment. The password entry setting in case of cancellation in FIG. 12 is described.

The password entry setting in case of cancellation is set using a valid button 12006 and an invalid button 12007 on the setting screen 12001. The valid button 12006 is used to validate the password entry setting in case of cancellation, whereas the invalid button 12007 is used to invalidate the password entry setting in case of cancellation. The user selects the valid button 12006 or the invalid button 12007 through the operation unit 210. The password entry setting in case of cancellation includes such selection of the valid button 12006 and the invalid button 12007. A change in the password entry setting in case of cancellation is stored in the SRAM 213 by the CPU 205 when a setting button 12004 for a password-added reservation printing function is selected.

The description returns to the processing illustrated in FIG. 11. If the CPU 205 determines that the password entry setting in case of cancellation is invalid (NO in step S11006), the operation proceeds to step S11001. If the CPU 205 determines that the password entry setting in case of cancellation is valid (YES in step S11006), the operation proceeds to step S11007.

In step S11007, the CPU 205 acquires the setting of the MFP 1000 from the SRAM 213, and determines whether the MFP 1000 manages the user authentication. If the CPU 205 determines that the MFP 1000 does not manage the user authentication (NO in step S11007), the operation proceeds to step S11011. In step S11011, the CPU 205 displays a password entry screen on the operation unit 210, and receives an entry of the password from the user. Subsequently, the operation proceeds to step S11012.

In step S11012, the CPU 205 acquires the password from the cancellation-instructed password-added print job. Subsequently, the operation proceeds to step S11013.

In step S11013, the CPU 205 compares the password entered by the user through the operation unit 210 with the acquired password for the password-added print job. Then, the operation proceeds to step S11014.

In step S11014, the CPU 205 determines whether the password entered by the user matches the password for the password-added print job. If these two passwords match each other (YES in step S11014), then in step S11004, the CPU 205 cancels the cancellation-instructed password-added print job. Subsequently, the operation proceeds to step S11005.

If the CPU 205 determines that the password entered by the user does not match the password for the password-added print job (NO in step S11014), then in step S11015, the CPU 205 displays an information screen (not illustrated) indicating that these two passwords do not match each other. Then, the CPU 205 ends the password-added print job cancellation processing.

If the CPU 205 determines that the MFP 1000 manages the user authentication (YES in step S11007), the operation proceeds to step S11008.

In step S11008, the CPU 205 acquires a role of the login user of the MFP 1000, and determines the role of the login user. If the CPU 205 determines that the login user is a general user (GENERAL USER in step S11008), then in step S11009, the CPU 205 acquires user information of the cancellation-instructed password-added print job and user information of the login user.

Subsequently, in step S11010, the CPU 205 determines whether the user information of the cancellation-instructed password-added print job matches the user information of the login user. If the CPU 205 determines that the user information of the cancellation-instructed password-added print job matches the user information of the login user (YES in step S11010), then in step S11004, the CPU 205 cancels the cancellation-instructed password-added print job. Then, the operation proceeds to step S11005.

According to such processing, therefore, if the password entry setting in case of cancellation is valid, and the user authentication is performed in the MFP 1000, the login user can instruct cancellation of his/her own password-added print job without entering the password. This can reduce labor of the login user in authentication performed when the login user cancels his/her own password-added print job, the labor being performed with respect to the MFP 1000 in which the password entry setting in case of cancellation is valid.

If the CPU 205 determines that the login user is an administrative user (ADMINISTRATOR in step S11008), then in step S11004, the CPU 205 cancels the cancellation-instructed password-added print job. Subsequently, the operation proceeds to step S11005.

According to such processing, if the login user has an administrator role with respect to the MFP 1000 in which the password entry setting in case of cancellation is valid, the MFP 1000 cancels the printing of the password-added print job without password entry. In such a case, the MFP 1000 cancels even the password-added print job which does not belong to the login user. This is the case in the present illustrative embodiment, since the login user serving as the administrator is expected to delete the print jobs of others from the MFP 1000 when these print jobs become unnecessary from an MFP management standpoint. Thus, the login user serving as the administrator can delete any password-added print job.

If the login user is determined as a guest user (GUEST USER in step S11008), the operation proceeds to step S11011. In step S11011, the CPU 205 displays a password entry screen on the operation unit 210, and receives the password from the user.

According to such processing, if the login user is the guest user with respect to the MFP 1000 in which the password entry setting in case of cancellation is valid, the MFP 1000 always requests the guest user to enter the password in case of cancellation. Since the MFP 1000 cannot identify an individual guest user, the MFP 1000 cannot determine the print job of the guest user among password-added print jobs. Consequently, even if the password entry setting in case of cancellation is valid, the MFP 1000 always requests the guest user to enter the password. The MFP 1000 makes such a request upon receipt of the cancellation instruction for the password-added print job from the guest user.

The second illustrative embodiment has been described. According to the second illustrative embodiment, authentication work with password entry is reduced with respect to the MFP 1000 in which the password entry setting in case of cancellation is valid. This can reduce the labor of the user when the password-added print job is printed.

In the first illustrative embodiment, the system administrator determines a password entry omission setting through the screen illustrated in FIG. 10. However, the password entry omission setting may be automatically determined according to a user authentication setting. For example, if a user authentication setting is invalid, the MFP 1000 may be forcibly operated in a password entry required mode by causing the valid button 10002 on the setting screen 10001 illustrated in FIG. 10 to be not selectable (e.g., the valid button 10002 is displayed in a shaded manner). In such a case, the CPU 205 determines whether to perform user authentication by referring to a setting value stored in the SRAM 213. If the CPU 205 determines that the user authentication is not needed, the CPU 205 automatically invalidates the password entry omission setting. Accordingly, this can reduce setting work of the system administrator.

The user authentication may not always be performed at the time of login of the user. For example, in a case where an MFP has functions such as copying, scanning, and printing, the necessity of user authentication may be individually set according to the functions (this is called a function-based authentication). If the MFP can perform such function-based authentication, the user authentication may be performed when a printing function is to be used. In such a case, a password entry omission setting may be automatically validated.

In the present illustrative embodiment, the password entry omission is determined according to whether the operation target password-added print job belongs to the login user. However, the password entry omission may be determined by other methods. For example, the password entry omission may be determined according to whether the user is the login user having an administrator authority. In such a case, the password entry is omitted if the user has the administrator authority, whereas the password entry is requested if the user is a general user or a guest user.

Alternatively, the password entry may be omitted as for users in a group (or a department) to which the login user belongs. For example, the MFP acquires a group ID (a department ID) of the login user and a group ID specified from a user name included in the operation target print job. If these two IDs match each other, the password entry can be omitted.

In the present illustrative embodiment, when the printing is to be performed, the user enters the password after selecting a job. However, the user may enter the password before selecting the job. In this case, the MFP can receive the password entered by the user, and specify the print job including the received password. Subsequently, the MFP can print the specified print job. That is, the MFP can automatically specify and print a single or a plurality of print jobs having a password which matches the entered password, so that the user does not need to select the print job. Moreover, the MFP can automatically specify and print only a print job which belongs to the login user and has a password matching the entered password.

Moreover, the necessity of user authentication and the validity of password entry omission setting may be selectively determined. For example, if the MFP is set to perform the user authentication, a password entry omission setting may be automatically invalidated. On the other hand, if the MFP is set not to perform the user authentication, a password entry omission setting may be automatically validated. Moreover, changes in the password entry omission settings and the user authentication settings may be made according to an instruction from a system administrator.

In the present illustrative embodiment, the MFP receives a password from the user if the login user differs from the owner of the print job, and a print instruction is received without user authentication (both of No in step S7004 and NO in step S7006 in FIG. 7). However, the present illustrative embodiment includes an illustrative embodiment in which the MFP receives a password from the user if any one of these two situations occurs. In other words, the present illustrative embodiment includes an illustrative embodiment in which the password is received from the user only if a print instruction is received without the user authentication, and an illustrative embodiment in which the password is received from the user only if the login user differs from the owner of the print job.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to illustrative embodiments, it is to be understood that the invention is not limited to the disclosed illustrative embodiments. The scope of the following claims is to be accorded the broadest interpretation so as to encompass all such modifications and equivalent structures and functions.

This application claims the benefit of Japanese Patent Application No. 2013-030898 filed Feb. 20, 2013, which is hereby incorporated by reference herein in its entirety.

What is claimed is:

1. A printer comprising:
    a selection unit configured to, in accordance with an authentication user's operation and a non-authentication user's operation, select a print job to which a job password is set, the authentication user having been authenticated when logging in to the printer, the non-authentication user having skipped authentication when logging in to the printer, the job password being used for starting a print process of the print job; and
    a control unit configured to, in a case where the print job has been selected by the selection unit in accordance with the authentication user's operation, control the printer to start the print process of the print job without requesting the authentication user to input the job password,
    wherein the control unit is configured to, in a case where the print job has been selected by the selection unit in accordance with the non-authentication user's operation, request the non-authentication user to input the job password so as to start the print process of the print job.

2. The printer according to claim 1, further comprising a display unit configured to display a plurality of print jobs so as to cause the selection unit to select a print job from the plurality of print jobs, the plurality of print jobs corresponding to different users,
    wherein the control unit is configured to, in a case where the authentication user has logged in to the printer, control the display unit to display a print job corresponding to the authentication user from among the plurality of print jobs, and
    wherein the control unit is configured to, in a case where the non-authentication user has logged in to the printer, control the display unit to display all of the plurality of print jobs.

3. The printer according to claim 2, wherein the control unit is configured to, in a case where the authentication user has an administrator authority, control the display unit to display all of the plurality of print jobs, even if the authentication user has logged in to the printer.

4. The printer according to claim 2, further comprising a setting unit configured to set a display condition for displaying print jobs,
wherein the control unit is configured to control, based on the display condition set by the setting unit, whether to control the display unit to display all of the plurality of print jobs or control the display unit to display a print job corresponding to the authentication user.

5. The printer according to claim 4, wherein the control unit is configured to, in a case where a job owner of the print job selected by the selection unit matches a user who has logged in to the printer, determine whether or not the selected print job is an encrypted print job for printing data encrypted using the job password, and in a case where it is determined that the selected print job is the encrypted print job, request the user to input the job password even if the logged-in user is the authentication user and the print job has been selected by the selection unit in accordance with the authentication user's operation.

6. The printer according to claim 4, wherein the control unit is configured to, in a case where the control unit requests input of the password, determine whether a password input by the authentication user or the non-authentication user matches the job password, and start the print process of the print job based on determination that the input password matches the job password.

7. The printer according to claim 4, wherein the printer is connected to a host computer over a network, and
wherein a job owner name of the print job is a user name of a user who uses the host computer.

8. The printer according to claim 1, wherein the control unit is configured to, in a case where a job owner of the print job selected by the selection unit is different from a user who has logged in to the printer, request the user to input the job password even if the logged-in user is the authentication user and the print job has been selected by the selection unit in accordance with the authentication user's operation.

9. The printer according to claim 1, wherein the non-authentication user is a guest user.

10. The printer according to claim 1, further comprising a setting storage unit configured to store setting information indicating whether or not input of the job password is allowed to be skipped,
wherein the control unit is configured to, even if the print job has been selected by the selection unit in accordance with the authentication user's operation, request the authentication user to input the job password so as to start the print process of the print job in a case where the setting information indicates that input of the job password is not allowed to be skipped.

11. The printer according to claim 1, wherein the control unit is configured to display a password enter screen so as to request input of the job password.

12. The printer according to claim 1, wherein the job password is a password input via a host computer when a print job is transmitted to the printer.

13. A method comprising:
selecting, in accordance with a user's operation, a print job to which a job password is set, the job password being used for starting a print process of the print job;
in a case where the print job has been selected in accordance with an authentication user's operation, controlling a printer to start the print process of the print job without requesting the authentication user to input the job password, the authentication user having been authenticated when logging in to the printer; and
in a case where the print job has been selected in accordance with a non-authentication user's operation, requesting the non-authentication user to input the job password so as to start the print process of the print job, the non-authentication user having skipped authentication when logging in to the printer.

14. A non-transitory computer-readable storage medium storing instructions that, when executed by one or more processors, cause the one or more processors to perform operations comprising:
selecting, in accordance with a user's operation, a print job to which a job password is set, the job password being used for starting a print process of the print job;
in a case where the print job has been selected in accordance with an authentication user's operation, controlling a printer to start the print process of the print job without requesting the authentication user to input the job password, the authentication user having been authenticated when logging in to the printer; and
in a case where the print job has been selected in accordance with a non-authentication user's operation, requesting the non-authentication user to input the job password so as to start the print process of the print job, the non-authentication user having skipped authentication when logging in to the printer.

* * * * *